United States Patent
Le Bouteiller et al.

(10) Patent No.: US 11,226,424 B2
(45) Date of Patent: Jan. 18, 2022

(54) METHOD FOR DETECTING GEOLOGICAL OBJECTS IN A SEISMIC IMAGE

(71) Applicants: IFP Energies nouvelles, Rueil-Malmaison (FR); Sorbonne Université, Paris (FR); Centre National de la Recherche Scientifique, Paris (FR)

(72) Inventors: Pauline Le Bouteiller, Rueil-Malmaison (FR); Jean Charlety, Rueil-Malmaison (FR)

(73) Assignees: IFP ENERGIES NOUVELLES, Rueil-Malmaison (FR); CENTRE NATIONALE DE LA RECHERCHE SCIENTIFIQUE, Paris (FR); SORBONNE UNIVERSITY, Paris (FR)

( * ) Notice: Subject to any disclaimer, the term of this patent is extended or adjusted under 35 U.S.C. 154(b) by 384 days.

(21) Appl. No.: 16/412,664

(22) Filed: May 15, 2019

(65) Prior Publication Data

US 2019/0353811 A1 Nov. 21, 2019

(30) Foreign Application Priority Data

May 18, 2018 (FR) .................................... 18/54.190

(51) Int. Cl.
  *G01V 1/30* (2006.01)
  *E21B 41/00* (2006.01)
  *E21B 49/00* (2006.01)

(52) U.S. Cl.
  CPC .......... *G01V 1/301* (2013.01); *E21B 41/0092* (2013.01); *E21B 49/00* (2013.01); *G01V 1/307* (2013.01)

(58) Field of Classification Search
  CPC .. G01V 1/301; G01V 1/307; G01V 2210/641; G01V 2210/665;
  (Continued)

(56) References Cited

U.S. PATENT DOCUMENTS 6,226,596 B1 * 5/2001 Gao .................... G01V 1/32
  367/73
6,438,493 B1 8/2002 West et al.
  (Continued)

FOREIGN PATENT DOCUMENTS

EP 1334379 A1 8/2003
EP 2659291 B1 2/2015

OTHER PUBLICATIONS

Jie Qi et al: "Semisupervised multiattribute seismic facies analysis", Interpretation, vol. 4, No. 1, (Feb. 1, 2016), pp. SB91-SB106, XP055580612.
(Continued)

*Primary Examiner* — Mohammad K Islam
(74) *Attorney, Agent, or Firm* — Fitch, Even, Tabin & Flannery LLP

(57) ABSTRACT

The invention is a method applicable to oil and gas exploration and exploitation for automatically detecting geological objects belonging to a given type of geological object in a seismic image, on a basis of a priori probabilities of belonging to a type of geological object assigned to each of samples of the image to be interpreted. The image is transformed into seismic attributes applied beforehand, followed by a classification method. For each of the classes, an a posteriori probability of belonging to a type of geological object is determined for each of the samples of the class according to the a priori probabilities, of the class, of belonging, and according to a parameter α describing a confidence in the a priori probabilities of belonging. Based on the class of the sample, the determined a posteriori (Continued)

probability of belonging to a type of geological object is assigned for the samples of the class. The geological objects belonging to the type of geological object are detected based on determined of the a posteriori probabilities of belonging to the type of geological object for each of the samples of the image to be interpreted.

11 Claims, 5 Drawing Sheets

(58) Field of Classification Search
CPC .... G01V 2210/667; G01V 1/302; G01V 1/32; E21B 41/0092; E21B 49/00
See application file for complete search history.

(56) References Cited

U.S. PATENT DOCUMENTS

| | | | |
|---|---|---|---|
| 9,008,972 B2 | 4/2015 | Imhof et al. | |
| 10,725,189 B2* | 7/2020 | Osypov | G01V 1/301 |
| 10,990,882 B2* | 4/2021 | Borrel | G01V 1/50 |
| 2011/0307438 A1* | 12/2011 | Fernández Martínez | G06N 7/005 706/52 |
| 2012/0257796 A1 | 10/2012 | Henderson et al. | |
| 2018/0372896 A1* | 12/2018 | Johansen | G01V 11/00 |

OTHER PUBLICATIONS

H Hashemi et al: "Clustering Seismic Datasets for Optimized Facies Analysis Using a SSCSOM Technique", 79th EAGE Conference & Exhibition, (Jun. 12, 2017), pp. 1-5, XP055580621.
Preliminary Search Report for FR 1854190, dated Apr. 16, 2019.
Written Opinion for FR 1854190, dated May 18, 2018.
Adams, R. et Bishof, L. (1994). Seeded region growing. IEEE Trans on Pattern Analysis and Machine Intelligence, vol. 16, pp. 641-647.
Bishop, C. M., Svensén, M. and Williams, C.K.I. [1998] GTM: The Generative Topographic Mapping. Neural computation, 10(1), 215-234.
Haralick, Robert M., Shanmugam, K. and Dinstein, I. «Textural Features for Image Classification» IEEE Transactions on Systems, Man, and Cybernetics. vol. SMC-3 (6), 1973, pp. 610-621.
Hashemi, H., De Beukelaar, P., Beiranvand, B. and Seiedali, M. [2017] Clustering seismic datasets for optimized faciès analysis using a SSCSOM technique. 79th EAGE Conference & Exhibition, Extended Abstracts, Tu B4 10.
Mumford, D. and Shah, J. (1989). Optimal approximation by piecewise smooth functions and associated variational problems. Communications on Pure Applied Mathematics, vol. 42, pp. 577-685.
Zhao, T., Zhang, J., Li, F. and Marfurt, K. J. [2016] Characterizing a turbidite system in Canterbury Basin, New Zealand, using seismic attributes and distance-preserving self-organizing maps. Interpretation, 4(1), SB79-SB89.
Zhao, T., Li, F. and Marfurt, K. [2016b] Advanced self-organizing map faciès analysis with stratigraphic constraint. SEG Technical Program Expanded Abstracts, 1666-1670.
Wang, Z., Hegazy, T., Long, Z. and AlRegib, G. [2015] Noise-robust detection and tracking of salt domes in postmigrated volumes using texture, tensors, and subspace learning. Geophysics, 80(6), WD101-WD116.

* cited by examiner

METHOD FOR DETECTING GEOLOGICAL OBJECTS IN A SEISMIC IMAGE

CROSS REFERENCE TO RELATED APPLICATIONS

Reference is made French Application No. 18/54.190 filed May 18, 2018, which are incorporated herein by reference in their entirety.

BACKGROUND OF THE INVENTION

Field of the Invention

The present invention relates to the field of exploring for and exploiting a fluid contained in a subterranean formation. In particular, the present invention relates to the field of exploring for and exploiting hydrocarbons that are present in a subterranean formation, or else to the field of exploring a subterranean formation with a view to geologically storing a fluid such as $CO_2$, or else to the field of monitoring a site at which a fluid is geologically stored.

Description of the Prior Art

Oil and/or gas exploration searches for hydrocarbon deposits within a sedimentary basin. The understanding of the principles of hydrocarbon formation and the relationships between hydrocarbons and the geological history of the ground has made it possible to develop methods for evaluating the oil and/or gas potential of a sedimentary basin. The general procedure for evaluating the oil and/or gas potential of a sedimentary basin includes going back and forth between a prediction of the oil and/or gas potential of the sedimentary basin, made using measurement information relating to the basin under study (outcrop analysis, seismic surveys, drilling for example), and exploratory drilling in various zones presenting the best potential, so as to confirm or to invalidate the previously predicted potential, and to acquire new information allowing the oil and/or gas potential predictions for the basin under study to be refined.

Exploiting the oil and/or gas of a deposit on the basis of the information gathered in the oil and/or gas exploration phase selects the zones of the deposit presenting the best oil and/or gas potential, in defining exploitation plans for these zones (for example using reservoir simulation, to define the number and positions of exploitation wells allowing optimal hydrocarbon recovery), in drilling exploitation wells and, generally, in putting in place the production infrastructure required for the development of the deposit.

A widely used technique in the field of oil and/or gas exploration and exploitation is seismic prospecting. Seismic prospecting generally has three steps: acquiring seismic data, processing these seismic data and, lastly, interpreting the processed seismic data, then referred to as a seismic image.

Interpreting a seismic image searches for geological objects (also known as geobodies) of interest within the seismic image. In general, it is possible to discern, within a seismic image:
- large-scale geological objects, such as the tops and bases of geological layers, erosion surfaces, faults, etc. This type of object is conventionally interpreted by a structural geologist or a geophysicist;
- smaller-scale geological objects, such as fluvial channels, dunes, turbidite deposits and mass-transport deposits (MTD). Typically, the smaller-scale geological objects are interpreted by a sedimentologist. These objects are characterized by particular patterns, formed by their internal reflectors.

Furthermore, it should be noted that a seismic image may also comprise seismic artefacts, which do not correspond to any actual geological object. These artefacts may originate in the seismic processing that has led to the seismic image. A geophysicist in particular is quite capable of recognizing such seismic artefacts.

Thus, by interpreting a seismic image, it is possible to deduce information on the subterranean formation under study, and in particular the presence, the shape and the type of geological objects in the formation. The seismic amplitudes associated with these objects also provide information on the petrophysical properties of the formation. The quality of the information from the interpretation of a seismic image is therefore critical. Specifically, representations of the formation under study, referred to as geological models, are constructed from this information. These representations make it possible to determine numerous technical parameters relating to the search for, the study of or the exploitation of a reservoir, for example a hydrocarbon reservoir.

However, very often, the geological objects in a seismic image are interpreted based on the experience of an interpreter, who knows, from experience, that the object in question has a given arrangement of characteristic reflectors or, in other words, a particular "seismic facies".

There are methods heading in the direction of automating the detection of certain types of geological objects in a seismic image. These methods allow the interpretation of seismic images to be sped up considerably (which is advantageous in the case of large volumes of seismic data to be interpreted), and also allow this interpretation to be made less reliant on the experience of the interpreter. At present, these methods perform relatively well for the large-scale geological objects such as defined above, but their performance is more limited in the case of smaller-scale geological objects.

In particular, certain types of geological objects appear in the seismic image as regions that combine several different aspects, or in other words several seismic facies. For this type of object, visual detection is, in some cases, possible for an experienced interpreter, but more difficult to implement automatically, which is prejudicial to the interpretation of large volumes of seismic data.

The following documents will be described in the rest of the description:

Adams, R. et Bishof, L. (1994). Seeded Region Growing. IEEE Trans on Pattern Analysis and Machine Intelligence, vol. 16, pp. 641-647.

Bishop, C. M., Svensén, M. and Williams, C. K. I. [1998] GTM: The Generative Topographic Mapping. Neural computation, 10(1), 215-234.

Carrillat, A., Randen, T., Sonneland, L. and Elvebakk, G. [2002] Seismic Stratigraphic Mapping of Carbonate Mounds Using 3D Texture Attributes. 64th EAGE Conference & Exhibition, Extended Abstracts, G-41.

Haralick, Robert M., Shanmugam, K. and Dinstein, I. «Textural Features for Image Classification». IEEE Transactions on Systems, Man, and Cybernetics. Vol. SMC-3 (6), 1973, pp. 610-621.

Hashemi, H., De Beukelaar, P., Beiranvand, B. and Seiedali, M. [2017] Clustering Seismic Datasets for Optimized Facies Analysis Using a SSCSOM Technique. 79th EAGE Conference & Exhibition, Extended Abstracts, Tu B4 10.

Kohonen, T. [1986] Learning Vector Quantization for Pattern Recognition. Technical report TKK-F-1601, Helsinki University of Technology.

Lloyd, Stuart P. "Least Squares Quantization in PCM." IEEE Transactions on Information Theory. Vol. 28, 1982, pp. 129-137.

Matos, M. C., Malleswar (Moe) Y., Sipuikinene M. A. and Marfurt K. J. [2011] Integrated Seismic Texture Segmentation and Cluster Analysis Applied to Channel Delineation and Chert Reservoir Characterization. Geophysics, 76(5), P11-P21.

Mumford, D. and Shah, J. (1989). Optimal Approximation by Piecewise Smooth Functions and Associated Variational Problems. Communications on Pure Applied Mathematics, vol. 42, pp. 577-685.

Zhao, T., Zhang, J., Li, F. and Marfurt, K. J. [2016] Characterizing a Turbidite System in Canterbury Basin, New Zealand, Using Seismic Attributes and Distance-Preserving Self-Organizing Maps. Interpretation, 4(1), SB79-SB89.

Zhao, T., Li, F. and Marfurt, K. [2016b] Advanced Self-Organizing Map Facies Analysis with Stratigraphic Constraint. SEG Technical Program Expanded Abstracts, 1666-1670.

Wang, Z., Hegazy, T., Long, Z. and AlRegib, G. [2015] Noise-Robust Detection and Tracking of Salt Domes in Postmigrated Volumes Using Texture, Tensors, and Subspace Learning. Geophysics, 80(6), WD101-WD116.

West, B. P. and May, S. R., inventors; Exxonmobil Upstream Research Company [2002] Method for Seismic Faciès Interpretation Using Textural Analysis and Neural Networks. U.S. Pat. No. 6,438,493, issued Aug. 20, 2002.

Conventionally, a distinction may be made between methods for detecting geological objects having homogeneous seismic properties (see section 1 below) and methods for detecting geological objects having heterogeneous seismic properties (see section 2 below).

1. Objects Having Homogeneous Seismic Properties

Among the existing methods for detecting objects having homogeneous internal seismic properties, what are referred to as "supervised" approaches to processing the seismic image, are known. For this type of method, a representation of the image is generally used instead of the original image in terms of amplitude. For example, it is possible to make representations of the image by filtering the image (using various filters), or by calculating statistics in each sample of the image with a predefined vicinity (first-, second- or higher-order statistics). With regard to interpreting seismic reflection data, an "attribute" refers to a quantity that may be calculated in the seismic image, which itself has a value per sample of the image. An attribute, or a combination of attributes (which may be simplified by calculating a single final attribute in several steps), is chosen for its representativeness of the seismic facies of the sought-after object. This attribute must be sufficiently discriminating for the facies in question, i.e. it must take very different values in the regions including the facies in question with respect to the other regions in the seismic image.

Next, for example by thresholding the values of this attribute, a binary image is determined in which the regions corresponding to the facies of interest are highlighted with respect to the others. Is also possible to use one or more sophisticated post-processing methods than just thresholding for detecting regions of interest. In particular, region-growing algorithms are known, these making it possible, starting from at least one seed point in the sought-after object, to grow, in the vicinity of this seed point, the region considered to be the "object" ever further outwards until a predefined stop criterion, relating to the obtained edge or to the values taken by the attributes inside this edge, is met.

For example, the document (Wang et al., 2015) is known, which implements a method for detecting a saline body in a seismic image, the saline bodies having, as is known, homogeneous seismic properties. In particular, this document describes the use of a textural attribute of "texture gradient" type, which characterizes, in each pixel of the seismic image, the variation in texture in the vicinity of this pixel. Next, a region-growing algorithm starting from a seed point placed in the target object (the saline body) is used. Thus, detection is based on properties that are initially fixed, by virtue of the homogeneous character of the saline body (both physically and in its seismic images).

The patent EP2659291 B1 describes a method allowing a plurality of attributes to be taken into account not by combining them into another attribute, but rather by applying a post-processing treatment using an edge detection algorithm (rather than a region-growing algorithm) separately for each attribute image. Edge detection allows a priori constraints to be introduced into the topology of the objects to be detected, since these are then represented by their edges (and it is these edges which undergo changes as the method is applied). The constraints that are introduced in edge detection allow topologically relevant objects to be obtained despite noise or the object being incompletely represented in the raw data. The process is run either sequentially (by calculating the edge only for one attribute image first, then for another attribute image, etc.) or simultaneously (by calculating the edge by including multiple constraints from the various attribute images). Thus, despite the introduction of a priori constraints into the topologies of the objects, and despite the use of several different attributes, the objects should have the same ranges of attribute values, that are homogeneous.

Thus, in general, these approaches are characterized by the presence of a "manual" (as opposed to "automatic") step of choosing reference facies characterizing the object to be detected. To emphasize, or use, the similarity between the facies of one region of the data and this reference aspect, these methods make use of attributes. Typical ranges of values for these attributes are chosen to define the reference aspect. Whatever the post-processing treatment (region growing or detecting and applying constraints to edges) used, thresholding of the attributes is therefore used to distinguish the regions corresponding to candidate objects (which are subsequently refined by the post-processing treatment). This approach is advantageous because it is object-based (for example for detecting saline bodies). However, it is not suitable for objects or regions characterized by heterogeneous seismic properties.

2. Objects Having Heterogeneous Seismic Properties

To distinguish objects with heterogeneous seismic properties, it is necessary to use an approach allowing the differences between regions of the seismic image to be highlighted in a non-binary manner. A distinction is made between supervised and unsupervised approaches.

2.1. Supervised Approaches

To represent the variability in facies that is present in a set of seismic data, it is possible to envisage classifying all of the samples of the seismic image. The supervised approaches performing this classification operation are typically based on a selection of a plurality of reference facies, these being meant to represent facies typical of those found in the dataset. This selection is made by manually studying the seismic data.

In the document (Carrillat et al., 2002), the user chooses seismic attributes that he or she deems to be coherent to discern the various facies in the dataset. Next, the user chooses thresholds (a plurality of thresholds over one or more attributes), which then allows each pixel of the data to be classified according to the predefined classes, by calculating the chosen attributes.

The patent EP 1334379 A1 corresponding to U.S. Pat. No. 6,438,493 B1, which describes a method in which the user chooses zones in the seismic image to be interpreted that he or she considers to be references for various facies; he or she also chooses seismic attributes that he or she deems to be relevant. A neural network with backpropagation then learns (in a training phase) the thresholds to be applied to each attribute to allow the set of information to be classified according to the initially chosen reference facies.

However, there are two major drawbacks to the reference facies being selected by the user:

- It limits the expression of the variability contained in the seismic image. Specifically, the set of reference facies chosen by the user might not fully cover the variety of facies that are present in the seismic image. This might lead to cases in which regions of the seismic image are assigned, during classification, to a facies A by default alone, whereas actually their specific aspect is quite different from facies A, even visually.
- The set of reference facies defined by the user might provide an unbalanced representation of this variability. Specifically, among these reference facies, certain facies (A and B for example) might be more similar to one another than others (A and C for example). This results in a bias in the probabilities that a region will be classed in one facies in particular, after classification. For example, if the user has defined a large number of classes (i.e. a large number of reference facies) for facies which are in fact relatively similar (e.g. facies A, B1, B2, B3, B4 and B5) and only one class for the remaining facies (e.g. facies C), the reference set is a poor representation of the variability in the data. For a region R, it would be possible to have, for example, probabilities of belonging to each reference facies that are distributed in the following manner: A (10%), B1 (10%), B2 (10%), B3 (10%), B4 (10%), B5 (10%), C (40%). Consequently, the region R will be assigned to the facies C, even though its probability of belonging to one of the aspects A, B1, B2, B3, B4 or B5 is 60%.

Thus, the variability in the facies that are present in a seismic image is therefore liable to be poorly represented due to the reference facies being chosen manually.

2.2. Unsupervised Approaches

The unsupervised methods have the advantage of not being prone to this potential bias introduced by the user. Specifically, for this type of approach, the reference aspects are defined automatically, on the basis of the information contained in the data.

In the field of seismic interpretation, seismic facies classification relies on unsupervised classification algorithms, often based on self-organizing maps (SOMs; see for example (Kohonen 1986)) which use a neural network, or else an alternative algorithm instead of SOM methods, based on a probabilistic approach such as described in the document (Bishop et al. 1998) and known as generative topographic mapping (GTM).

For these two algorithms, the clusters that are produced are organized specifically ("arranged"), and continuous in their features along this "arrangement". In particular, (1) this makes the visualizations of the classification more useful for interpretation, since close colors correspond to close, and hence similar, clusters; and (2) increasing the number of clusters searched for does not change the overall appearance of a visualization with a good color scale, since then just more classes are added within the same color scale.

These advantages make it easier for the user to interpret facies, who then manually post-processes the data with its classification. Examples are given in the document (Matos et al., 2011) which, after using an SOM-type method, interprets the classification to determine the "delineations" of channels and reservoirs. The document (Zhao et al., 2016) is also known, which uses a method referred to as a "distance-preserving SOM", or DPSOM, method, which is a refinement of the SOM approach. DPSOM improves upon the calculation in SOM: the calculation of the position of nodes in the latent space is adjusted so that the distances in the data space are preserved. This results in a representation (in the latent space) that is more discriminating between the various types of facies (more representative of the differences between the values of attributes in the data space). However, in general, these unsupervised classification algorithms require a manual step, carried out by an interpreter, of interpreting classes. Specifically, unsupervised classification methods assign labels to all of the samples of a seismic image, but do not indicate which labels are relevant with respect to the sought-after geological object. Moreover, this type of method also does not indicate whether groups of labels (of classes) are found frequently in the seismic image. This task is left up to an interpreter, who must in particular be trained to understand the results from an unsupervised classification method. Moreover, this type of approach does not allow a priori information to be incorporated.

What are referred to as semi-supervised methods are also known. These methods improve on the unsupervised algorithms by introducing constraints based on information other than seismic information.

Such an approach is described in particular in the document (Zhao et al., 2016b), which teaches an SOM algorithm constrained by VMD (variational mode decomposition), which is an operation of decomposing the seismic signal into a plurality of components and which provides information on possible stratigraphic cycles in a given seismic trace. This VMD information corresponds to the a priori information in this semi-supervised approach. It constrains the SOM method to classify the regions of one and the same stratigraphic layer in close (similar) classes. This a priori information has the advantage of being neutral and objective since it comes directly from the seismic information, which is a clear advantage in comparison with other a priori information defined by users (such as in the supervised methods for detecting homogeneous objects, or the supervised facies classification methods, described above). However, the approach does not search for objects belonging to a particular type (such as MTDs or saline bodies), and no post-processing treatment is provided in this regard.

The document (Hashemi et al., 2017) is also known, which uses facies maps from well log analysis as the constraint. It is therefore a question of spatial constraint. However, like in the preceding paragraph, the method does not allow objects belonging to a particular type (such as MTDs or saline bodies) to be found.

The interpretation carried out after classification is illustrated in the U.S. Pat. No. 9,008,972. Once the seismic dataset has been classified into regions which each bear a class label (in other words a class identifier), a new ranking is assigned to the various classes themselves, according to their ability to meet a certain objective. This ranking is generated by an interpreter on the basis of a predefined criterion; the interpreter will (re-)use a seismic attribute (or a combination of attributes), or a non-physical attribute that however corresponds to his or her specific interpretation of the classes. This will result in a quantitative ranking of the regions of the seismic image, generated according to a particular objective (for example, classing those zones which are most likely to represent hydrocarbon traps in decreasing order of probability). Thus, the interpreter must be an expert in the attributes and algorithms used to classify seismic images. Moreover, the regions are analysed one at a time and an object represented by a group of various classes can not be detected with this approach.

Thus, these un- or semi-supervised clustering algorithms have great potential when it comes to classifying large datasets and expressing all of the internal variability of a dataset without omitting seismic properties (or seismic facies) that are less common than others (unlike in the supervised methods). However, they do not include the detection of geological objects. No particular strategy is provided for delineating geological objects after the samples of the image to be processed have been fully classified, even though constraints might have been added during processing (as in the case of semi-supervised method). A manual step for assembling the clusters together into groups of interest for interpretation is necessary for now, in the capacity of a post-processing treatment, for studying/detecting objects in the data. This step is liable to lack objectivity and to require a large amount of time and knowledge (relating to the operation of the classification algorithm, etc.) on the part of the interpreter. In any case, in particular when it comes to guiding the interpretation towards obtaining delimited geological objects, this manual step is necessary in the existing methods.

Thus, fully automated methods for interpreting seismic images are for now limited to objects with homogeneous seismic properties. There are methods for representing heterogeneous seismic facies from a set of seismic data, but not for automatically and objectively detecting objects having heterogeneous facies.

SUMMARY OF THE INVENTION

The present invention overcomes these drawbacks by allowing the automated detection of geological objects, in particular geological objects having heterogeneous seismic facies. Additionally, the present invention may be parameterized using a seismic learning image and then it is possible to apply the parameters determined using the learning image to another seismic image, for example including the seismic learning image, or a seismic image from a neighboring seismic survey.

The invention is a computer-implemented method for automatically detecting at least one geological object belonging to a type of geological object in at least one seismic image of a subterranean formation, on the basis of a priori probabilities of belonging to the type of geological object that are assigned to each of the samples of the image.

The method according to the invention comprises at least the following steps:
  A. an operation of transforming the image into seismic attributes is defined and the transform operation is applied to determine seismic attributes of the image;
  B. an unsupervised classification operation is applied to the seismic attributes of the image and a class for each of the samples of the image is determined;
  C. for each of the classes, an a posteriori probability of the samples of the class belonging to the type of geological object is determined according to the a priori probabilities of the samples of the image, of the class, belonging to the class, and according to a parameter $\alpha$ describing a confidence in the a priori probabilities;
  D. for each sample of the image, on a basis of the class of the sample, the determined a posteriori probability of belonging to the type of geological object is assigned to the sample for the samples of the class.

Next, according to the invention, the geological object belonging to the type of geological object is detected on the basis of the determined a posteriori probabilities of belonging to the type of geological object for each of the samples of the image.

According to one implementation of the invention, the a posteriori probability $y_i$ of the samples of the class i belonging to the type of geological object may be determined in the following manner:

i. if $p_{1,i} > \frac{1}{\alpha+1}$, $y_i = s_1$.

ii. if $p_{1,i} \leq \frac{1}{\alpha+1}$, $q_i = \max\left\{k \in 1{:}n \text{ such that } \sum_{j\in 1:k} p_{j,i} \leq \frac{1}{\alpha+1}\right\}$ is determined a. if $\sum_{j\in 1:q} p_{j,i} = \frac{1}{\alpha+1}$, then $y_i = s_q$.

b. if $\sum_{j\in 1:q} p_{j,i} < \frac{1}{\alpha+1}$, then if $q = n$, $y_i = s_n$ if $q < n$, $y_i = s_{q+1}$.

where
  X is a vector containing a value of the a priori probability of belonging for each sample of the seismic image;
  L is a vector containing, for each of the samples of the seismic image, an identifier of the class to which the sample belongs;
  $S = \{s_1, s_2, \ldots s_n\} = \{s_k, k \in 1{:}n\}$ with $0 = s_1 < s_2 < \ldots < s_n = 1$, is the set of values taken by the elements of the vector X;
  $C_i$, $i \in L$ is the identifier class i;
  $p_{k,i} = p(s_k | C_i)$ is the proportion of points of $C_i$ having an a priori probability value of $s_k$.

Advantageously, the seismic attributes may be textural attributes.

Preferably, a decrease in dimension may be applied to the determined attributes by the transform operation.

Highly preferably, the decrease in dimension may be carried out by means of principal component analysis.

Alternatively, the decrease in size may be carried out by use of analysis of an attribute selection method.

According to one implementation of the invention, the unsupervised classification method may be a generative topographic mapping method.

According to one variant implementation of the invention, at least the steps A) to D) may be applied to a first seismic image, and at least the following steps may then be applied to a second seismic image:
  I. the operation of transforming into seismic attributes is applied to the second image to determine a plurality of seismic attributes of the second image;

II. the unsupervised classification operation is applied to the attributes of the second image and a class for each of the samples of the second image is determined;

III. for each of the classes of the second image and for each of the samples of the second image belonging to the class, the determined probability of belonging to the type of geological object is assigned for the class in the first image.

According to one variant implementation of the invention, the geological objects belonging to the type of geological object may be detected in the at least one image by use of a thresholding method that is applied to the values of the determined a posteriori probabilities of belonging to the type of geological object for each of the samples of the at least one image.

The invention also relates to a method for exploiting a subterranean formation comprising hydrocarbons by use of at least one seismic image relating to said formation, wherein:

geological objects belonging to at least one type of geological object are detected in the seismic image by use of the method such as described above;

a geological model that is representative of the formation is defined on the basis at least of the detected geological objects and a plan for exploiting the hydrocarbons of the formation is defined on the basis at least of the geological model;

the hydrocarbons of the formation are exploited according to the exploitation plan.

The invention further relates to a computer program product that is recorded on a tangible medium, comprising program code instructions for implementing the method such as described above, when the program is executed on a computer.

Other features and advantages of the method according to the invention will become apparent upon reading the following description of nonlimiting exemplary embodiments with reference to the appended figures described hereinbelow

DETAILED DESCRIPTION OF THE INVENTION

Figure 1:
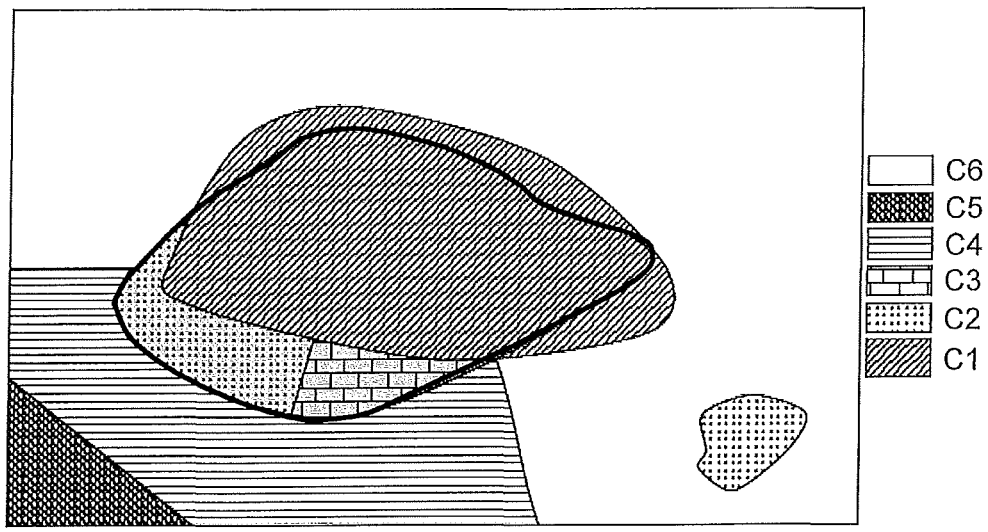
FIG. 1 shows, in a theoretical example, the distribution of the classes determined by use of a classification method, with respect to a geological object to be detected.

In general, one of the subjects of the invention relates to a computer-implemented method for automatically detecting samples of at least one seismic image of a subterranean formation which belong to a predefined type of geological object. The method according to the invention may advantageously be applied to the detection of a type of geological object that is characterized by heterogeneous seismic properties, or in other words a type of geological object that is characterized by heterogeneous seismic facies. Such heterogeneous seismic facies comprise, nonlimitingly, mass-transport deposits (MTDs), fluvial channels with heterogeneous seismic properties or else geological bevels (such as bevelled contact between tilted geological layers and an erosion surface). The method may however also be applied to the detection of geological objects that are known to have homogeneous seismic properties, such as saline bodies, in particular when the internal facies of these objects vary slightly.

Thus, the method according to the invention is implemented for a given type of geological object, and is advantageously repeated if it is desired to detect another type of geological object in the same seismic image.

The seismic image is either a two-dimensional (2D) or three-dimensional (3D) image, in which one of the axes is the time axis (seismic image in the time domain) or else the depth axis (seismic image in the depth domain), and the one or more other axes correspond to the horizontal axes of a geographical space. The method according to the invention may also be implemented on a plurality of 2D and/or 3D seismic images. These one or more seismic images might have been obtained by use of seismic measurements (generally referred to as "seismic acquisition surveys") and by processing these seismic measurements (generally referred to as "seismic processing"). The steps to be implemented so as to obtain a seismic image of a subterranean formation are known.

The method according to the invention requires the availability of a priori probabilities of belonging to the sought-after type of geological object with these probabilities being assigned to each of the samples of the seismic image under consideration. In other words, each sample (a pixel in the case of a two-dimensional seismic image or a voxel in the case of a three-dimensional seismic image) of the seismic image under consideration must have a value that is representative of the probability of this sample belonging to a geological object of the sought-after type.

According to one nonlimiting embodiment of the invention, the method may comprise the following steps:
1. Determining a priori probabilities in the seismic image
2. Determining seismic attributes in the seismic image
3. Classifying the seismic image in the attribute space
4. Determining an a posteriori probability of belonging
5. Propagating the a posteriori probabilities to another seismic image
6. Automatically detecting geological objects
7. Exploiting the subterranean formation However, in general, the method according to the invention comprises at least steps 2 to 4 and step 6.

Thus, the obtaining a priori probabilities of belonging, required for implementing the invention, may be obtained by implementing step 1, which is optional.

According to one advantageous implementation of the invention, when there are large volumes of seismic data to be interpreted, steps 2 to 4 are applied to at least one seismic image, which is a seismic learning image, and the parameters of the method that are determined using this seismic learning image are subsequently applied, as described in step 5, to at least one second seismic image, for example of larger dimension than the seismic learning image. Thus, in the case of a 2D seismic image to be interpreted, the seismic learning image may for example correspond to a window in the overall seismic image, of larger dimension. In the case of a 3D seismic image to be interpreted, the learning operation may be carried out on a series of 2D seismic sections chosen from the 3D volumetric image, or else one or more 3D sub-volumes in this 3D seismic volume.

Step 7, which is also optional, relates to the exploitation of the subterranean formation for which a seismic image has been interpreted by at least steps 2 to 4.

The steps for nonlimitingly implementing the method according to the invention described above are detailed below with steps 1, 5 and 7 being optional.

1. Determining a Priori Probabilities in the Seismic Image

This step is optional, since the a priori probabilities of belonging to the type of geological object that it is sought to be detected may have been determined beforehand and are then provided as input to the method according to the invention.

In this step, it is a question of defining regions within the seismic image under study (which may also be a seismic learning image) and of assigning a probability of belonging to the sought-after geological object to these regions, or in other words an a priori probability of belonging to the type of geological object that it is sought to be detected.

According to one implementation of the invention, an automatic method for defining geological objects is used, which is an alternative to the method according to the invention, of, for example, in (i) calculating a seismic attribute chosen to be (at least partially) discriminating for at least some of the sought-after objects; (ii) normalizing the values of the attribute between 0 and 1; (iii) assigning this result to each region of the seismic image as an a priori probability.

According to another implementation of the invention, it is also possible to determine a priori probabilities of belonging to the sought-after type of geological object by using types of information other than seismic information, such as for example well logs from at least one well passing through the formation under study. According to one implementation of the invention, it is for example possible: (i) for each well for which a well log has been made, to determine a geological facies log by processing well logs conventionally and deducing therefrom a proportion of the object to be detected present with depth down the well under study; (ii) to propagate this determined information to the various wells throughout or in part of the space covered by the seismic image to be interpreted, by interpolation or by a geostatistical method; (iii) to assign this result, normalized between 0 and 1, to each region of the seismic image, as an a priori probability.

According to one implementation of the invention, regions in the seismic image under consideration (which may optionally be a learning image) are delimited by use of at least one of manual and automatic interpretation of the geological objects in the seismic image under consideration and a probability of belonging to the sought geological object is assigned to each of these regions. According to one implementation of the invention:

a value of a priori probability of belonging of 1 is assigned for the samples of the seismic image belonging to regions for which it is thought that the delimited region corresponds to the sought type of geological object; and a value of a priori probability of belonging of 0 is assigned for the samples of the seismic image belonging to regions for which it is thought that the delimited region does not correspond, with certainty, to the sought-after type of geological object;

intermediate probability values (for example values of 0.25, 0.5 or 0.75) are assigned for the other regions, according to the likelihood of them belonging to the sought type of geological object.

2. Determining Seismic Attributes in the Seismic Image

In this step, an operation of transforming the seismic image (which may also be a learning seismic image) into a plurality of seismic attributes is defined and the transform thus defined is applied to determine a plurality of seismic attributes that are associated with the seismic image under consideration. Advantageously, at least four seismic attributes are determined, which potentially allows $2^4=16$ different types of seismic facies to be distinguished, and thus geological objects having particularly heterogeneous seismic properties to be characterized. Advantageously, attributes are chosen so that they represent the variability of the seismic facies in the seismic image under consideration.

Preferably, the determined seismic attributes comprise textural attributes, which are attributes for which the value in each sample characterizes the texture of the image in the vicinity of this sample. The value in each sample is generally a statistical quantity of the distribution of seismic amplitude values in a lateral and vertical vicinity of the sample of the seismic image (for example taking into account second-order statistics in the vicinity of each sample of a seismic image). Thus, this type of attribute is particularly suitable for distinguishing between various types of seismic facies in a seismic image since they provide information on the local organization of the reflectors in an image at a fine level of detail. Among textual attributes, attributes from the grey-level co-occurrence matrix (GLCM) are known. GLCM attributes were initially introduced (see for example the document (Haralick, 1973)) for image processing in general, and now see wide use in seismic interpretation. An attribute is calculated in a greyscale image, for a predefined orientation theta and inter-pixel distance d. This calculation is performed in two steps: first, the co-occurrence matrix $M(r,c)$ is constructed, which indicates, for each grey-level pair $(r,c)$, the number of pairs of pixels in the adjacency window of a pixel (or sample of the seismic image) that are separated by a vector of norm d and of angle theta and have grey levels r and c; then statistical quantities are calculated using this matrix. In general, textural attributes also have the advantage of being calculated according to one and the same calculation procedure, to the extent that in calculating them all, all of the possible patterns are scanned (for example, with the GLCM attributes, an attribute is calculated per orientation, and they are all calculated in the same way).

According to another implementation of the invention, the predetermined seismic attributes comprise spectral attributes, this type of attribute additionally providing information on size scales. According to another implementation of the invention, it is also possible to use seismic attributes that are conventionally used in seismic interpretation, such as coherence or autocorrelation.

According to one implementation of the invention, if the values of the determined seismic attributes are not of the same order of magnitude (for example if there is a ratio of 1 to 10 between two attributes), the values of the attributes thus determined are normalized.

According to one implementation of the invention, if it turns out that the attributes thus determined are correlated, an operation of decreasing the dimension of the determined attributes is performed. For this, a feature (or attribute) extraction method, such as principal component analysis (PCA) or a feature (or attribute) selection method, may be applied to the determined attributes. According to one advantageous implementation of the invention in which the PCA method is applied, only those attributes which are projected into the reference frame of the eigenvectors from the PCA, the sum of the normalized eigenvalues of which is greater than 0.95, are retained. According to one implementation of the invention in which an attribute selection method is applied, a selection of the initial attributes is retained, the selection being defined such that the selected attributes represent the total variance (or a percentage of 0.95 for example) of the scatter plot and exhibit the smallest possible degree of correlation (optimizing the selection of attributes therefore minimizes the correlation of the selected set while maximizing the variance that is represented).

3. Classifying the Seismic Image in the Attribute Space

In this step, an unsupervised-type classification method is applied to the seismic attributes determined upon completion of step 2 described above, that is potentially to the attributes after dimension decrease. Thus, in this step, the seismic image in the multi-attribute space, and no longer the seismic image expressed in terms of seismic amplitude, is considered.

According to the invention, the attributes from the seismic image are classified by use of a self-organizing map (SOM) algorithm such as described for example in (Kohonen 1989), or else a generative topographic mapping (GTM) algorithm such as described for example in (Bishop, 1998), or else a K-means algorithm such as described for example in the document (Lloyd, 1982). In the case of an SOM or GTM method, the classification operation generates a non-linear representation of the data by of a manifold of small dimension (typically 2), in which a (potentially irregular) grid containing the class centres is located. During the implementation of the SOM or GTM algorithm, the positions of the class centers in the manifold and in the data space are optimized (and in the case of GTM, the manifold itself is parameterized). For this type of approach, the number of classes is predefined in advance. The way in which a number of classes is defined ad hoc so as to implement an unsupervised-type classification method is known.

Upon completion of this classification step, a class is assigned to each sample (a pixel in a 2D image or a voxel in a 3D seismic image) of the seismic image under consideration. In other words, each sample of the seismic image under consideration possesses a class "label", or else an identifier of the class to which it belongs. Conventionally, the identifier of the class of each sample of the seismic image is a class number.

4. Determining an a Posteriori Probability of Belonging

According to the invention, it is a question of assigning, to each class obtained upon completion of the preceding step, an a posteriori probability of belonging to the sought type of geological object. This a posteriori probability is estimated according to:

a priori probabilities of belonging to the sought geological object, determined for example as described in step 1;

the class division determined upon completion of step 3; and a parameter $\alpha$, which is predefined (in particular by a specialist), that allows the confidence in the quality of the a priori interpretation of the geological objects in the seismic image (which may also be a learning seismic image) to be qualified. According to one implementation of the invention, the parameter $\alpha$ for a given seismic image is between 0 and 1, the value 0 being attributed in the case of a highly doubtful a priori interpretation of the geological objects and, conversely, 1 being attributed in the case of the confidence in the interpretation being high. The parameter $\alpha$ may also be used to afford the detection algorithm according to the invention a certain "flexibility" (0 for a high degree of flexibility and 1 for no flexibility). The parameter $\alpha$ may also make it possible to take into account the potential absence of annotation for certain objects, for example if it is thought that some geological objects, corresponding to the type of object to be detected, have not been interpreted a priori in the (potentially learning) seismic image.

The following notation is used hereinafter:

X is the vector containing a value of a priori probability of belonging for each sample of the seismic image under consideration;

L is the vector containing, for each sample of the seismic image under consideration, the identifier of the class to which the sample belongs;

$S=\{s_1, s_2, \ldots, s_n\}=\{s_k, k \in 1:n\}$ with $0=s_1<s_2<\ldots<s_n=1$, is the set of values taken by the elements of X;

$C_i$, $i \in L$ is the number class i of the classification described by L;

$p_{k,i}=p(s_k|C_i)$ is the proportion of points of $C_i$ having an a priori probability value of $s_k$;

Y is the vector containing, for each sample of the image under consideration, the a posteriori probability.

According to one preferred implementation of the invention, the a posteriori probability $y_i$ of belonging to the sought type of geological object is determined for each number class i of the classification described by L as described below:

$$\text{if } p_{1,i} > \frac{1}{\alpha+1}, y_i = s_1.$$

$$\text{If } p_{1,i} \leq \frac{1}{\alpha+1},$$

the following is determined:

$$q_i = \max\left\{k \in 1{:}n \text{ such that } \sum_{j\in 1:k} p_{j,i} \leq \frac{1}{\alpha+1}\right\}, \text{ and}$$

a. if $\sum_{j\in 1:q} p_{j,i} = \frac{1}{\alpha+1}$, $y_i = s_q$.

b. if $\sum_{j\in 1:q} p_{j,i} < \frac{1}{\alpha+1}$, if $q = n$, $y_i = s_n$ if $q < n$, $y_i = s_{q+1}$.

Thus, the method according to the invention allows both an a priori probability of belonging and information on the structure of the dataset, represented by the result of the classification operation, to be employed while taking into account a degree of confidence in the a priori interpretation, which is predefined.

Upon completion of this step, a single a posteriori probability value is obtained per class, which is close to the arithmetic mean of the a priori probabilities of all of the samples of the class (in particular, it is equal to the arithmetic mean in the case that the value of the parameter $\alpha$ is equal to 1) but which may include a certain degree of flexibility, via the parameter $\alpha$, according to the confidence in the a priori interpretation.

Next, an a posteriori probability of belonging to the sought geological object is assigned to each sample of the seismic image under consideration according to the class (for example identified by a class identifier) to which the sample under consideration belongs.

5. Propagating the a Posteriori Probabilities to Another Seismic Image

This step is optional. It is applied in the case that the a priori probabilities of belonging to the sought-after geological object have been predefined using a learning seismic image, such as defined above, and that it is desired to automatically detect geological objects of the type under consideration in another seismic image, referred to hereinafter as the "overall seismic image". It is obvious that the learning seismic image and the overall seismic image should have, preferably and as far as possible, similar seismic parameters. For example, the seismic data on which these two seismic images are based should preferably have been recorded using the same acquisition parameters (in particular the sampling intervals) or have been corrected so as to get them to the same acquisition parameters (this type of correction is conventionally carried out in 4D seismic processing for example). Additionally, the seismic data on which these two seismic images are based should preferably have undergone the same seismic processing or have been corrected so as to get them to the same seismic processing (this type of correction is conventionally carried out in 4D seismic processing for example); specifically, it is important that the seismic amplitudes of the learning images and of the overall image to be interpreted be in similar ranges. These constraints and the obtaining of them are known, using routine seismic processing methods.

Upon completion of step 4, a posteriori probabilities of belonging to the sought geological object, associated with each of the classes determined using the learning seismic image, are obtained in particular. In this step, it is a question of "propagating" these a posteriori probabilities, determined using the learning seismic image, to the overall seismic image.

According to the invention, this propagation operation is performed as follows:

I. The seismic attribute transform, such as defined in step 2 and applied to the learning seismic image, is applied to the overall seismic image. Next, a plurality of seismic attributes of the overall seismic image are determined, which attributes are the same (in terms of type and number) as those determined using the learning image. Preferably, the post-processing treatments (normalization, dimension decrease; see step 2 above) applied to the attributes determined for the learning seismic image are advantageously also applied to the attributes of the overall seismic image, using the same post-processing operation parameters as those used for the learning seismic image.

II. The unsupervised classification method, such as defined in step 3 and applied to the attributes of the learning seismic image, are applied to the attributes of the overall seismic image. Here, the same classification method as that applied in step 3 to the learning image, parameterized in the same way, and in particular with the same number of classes, is applied. A class identifier for each sample of the overall seismic image is thus obtained, for example.

III. For each of the classes of the overall seismic image and for each of the samples of this overall seismic image belonging to this class (for example identified by a class identifier), the a posteriori probability of belonging determined for this class using the learning seismic image is applied.

Thus, upon completion of this step, a posteriori probabilities of belonging to the sought geological object are obtained for an overall seismic image on the basis of a posteriori probabilities of belonging to the sought geological object that were determined using a learning seismic image. In particular, this makes possible saving a substantial amount of time when large volumes of seismic data are to be interpreted, since the a posteriori probabilities of belonging are determined finely only for the learning seismic image. This implementation of the invention also allows the size of the computer memory used to determine the a posteriori probabilities of belonging to be limited.

6. Automatically Detecting Geological Objects

In this step, it is a question of automatically detecting, on the basis of the a posteriori probabilities of belonging to the sought geological object that were determined in step 4 and/or 5, geological objects of the type sought after in the seismic image of interest.

This detection operation may be applied by use of any type of known method for automatically detecting geological objects having homogeneous internal properties, since the a posteriori probability values that have thus been determined may then be used as attributes for the implementation of this type of method. In other words, the method according to the invention makes it possible, on the basis of highly heterogeneous and complex seismic information, to determine an image having more homogeneous properties, making the application of methods for detecting geological objects having homogeneous internal properties possible.

According to one implementation of the invention, it is possible, on the basis of the a posteriori probabilities of belonging for each sample of the seismic image under consideration, to automatically detect the geological objects in this image of the type of that sought by means of the following methods:

thresholding is applied to the a posteriori probability values: for example, only those samples of the seismic image having a posteriori probability values that are higher than 0.8 are retained; and/or a region-growing algorithm is used, implemented with a predefined criterion pertaining to the values of a posteriori probabilities of belonging that are expected inside objects of the type of object to be detected. Reference may be made to the document (Adams and Bishof, 1994), which describes this type of method. In general, a region-growing algorithm defines seed points for the regions, then in growing these regions by measuring similarity between samples until a stop criterion is met. It is well known that these methods perform best when the seed points are chosen in homogeneous zones of the image to be interpreted.

An implicit or explicit edge detection algorithm is used. Reference may be made to the document (Mumford and Shah, 1989), which describes this type of method in general.

7. Exploiting the Subterranean Formation

From at least the geological objects detected by implementing at least steps 2 to 4 and 6 described above for at least one type of geological object to be detected, valuable information relating to the subterranean formation which is sought to exploit, for example, hydrocarbons is obtained.

Specifically, a conventional approach is in particular to construct a meshed representation of the formation under study, which representation is known as a geomodel, for the purpose of exploiting this formation. Each mesh of this meshed representation is filled with one or more petrophysical properties, such as porosity, permeability, the type of sedimentary deposit, etc. This meshed representation reflects in particular the geometry of the geological objects encountered in the formation under study. It is thus most frequently structured in layers, with a group of meshes being assigned to each geological layer of the modelled basin. However, it advantageously reflects the presence of smaller-scale geological objects (such as MTDs, fluvial channels, etc.) by use of meshes having petrophysical properties that are distinct from the layers in which these objects are embedded. In general, this model is constructed on the basis of data acquired in seismic surveys, from well logs, from core samples, etc. Thus, the information obtained by implementing the method according to the invention, by improving knowledge of the geological objects that are present in the formation, will contribute to the construction of a more accurate geological model of the formation under study.

From such a meshed representation, in particular zones of interest are selected in the subterranean formation, and in particular geological reservoirs that are likely to be highly productive in hydrocarbons (on the basis of criteria such as high porosity, high permeability, the presence of a cap rock, etc.). From such a meshed representation, a prediction may be made of the movements of fluid through the formation under study and to plan its future development by determining plans for exploiting the formation. In particular, determining a plan for exploiting a subterranean formation comprises defining a number, a geometry and siting (position and spacing) of injection and production wells, determining an enhanced recovery type (water, surfactant injection, etc.), etc. A plan for exploiting a hydrocarbon reservoir should for example allow a high rate of recovery of hydrocarbons trapped in the identified geological reservoir, over a long period of exploitation, requiring a limited number of wells and/or amount of infrastructure. Conventionally, a hydrocarbon exploitation plan is determined using a numerical flow simulator. One example of a flow simulator is the PumaFlow® software (IFP Energies nouvelles, France).

Next, once an exploitation plan has been defined, the hydrocarbons trapped in the reservoir are exploited as per this exploitation plan, in particular by drilling at least one of the injection and production wells according to the determined exploitation plan, and by installing the production infrastructure required for the development of the deposit.

Equipment and Computer Program Product

The method according to the invention is implemented by use of equipment (for example a computer workstation) comprising data processing (a processor) and data storing (a memory, in particular a hard disk), and an input/output interface for inputting data and returning the results of the method.

The data processor is in particular configured to carry out the following steps:

a plurality of seismic attributes of the seismic image are determined;

an unsupervised classification method is applied to the seismic attributes;

an a posteriori probability of belonging to the sought type of geological object is determined for the samples of each of the classes;

an a posteriori probability of belonging to the sought type of geological object is determined for each of the samples of the seismic image; and and at least one geological object of the type sought is detected on the basis of the a posteriori probabilities of belonging for each sample of the seismic image.

Furthermore, the invention further relates to a computer program product stored on a tangible recording medium that is readable by computer and executable by a processor, comprising program code instructions for implementing the method such as described above, when the program is executed by the processor.

Variant: Prior Acquisition of a Seismic Image

The method according to the invention is implemented using at least one seismic image of a subterranean formation. According to one variant embodiment of the invention, a seismic image is determined prior to the implementation of the method according to the invention. The acquisition of such a seismic image comprises a seismic measurement step, then a seismic processing step of processing these seismic measurements.

The seismic measurement step is carried out by a seismic measurement device. The seismic measurement device comprises means such as explosives or a vibrator for terrestrial seismology, or an air gun or a water gun for marine seismology which emits one or more seismic waves into the subterranean formation of interest, as well as means (such as acceleration sensors (seismometers), vibration sensors (geophones), pressure sensors (hydrophones), or by a combination of elementary sensors of the preceding types (for example multicomponent sensors)) for recording the waves thus emitted and being at least partially reflected in the formation under study. The equipment for acquiring seismic measurements produces a seismic image of a subterranean formation.

The seismic processing step is applied to the seismic measurements taken of the subterranean formation under study. Specifically, the seismic measurements recorded as described above are very often unusable. Conventionally, the seismic processing operation may comprise a step of correcting the recorded seismic amplitudes, a deconvolution operation, statics corrections, (random or coherent) noise filtering, NMO (normal moveout) correction, stacking and migration (depthwise or in time, before or after stacking). These processing steps, requiring calculations that are often long and complex, are carried out by computer. The resulting seismic data are the seismic image. These seismic images are most frequently depicted on a computer, by means of a mesh or grid. Each mesh corresponds to a lateral and vertical position (the vertical direction corresponding to the time or to the depth at which the processing operation resulted in a time image or a depth image) within the formation under study, and further being characterized by a seismic amplitude. The equipment for applying seismic processing ad hoc to seismic measurements to generate a seismic image of a subterranean formation, which image is intended for seismic interpretation is known.

EMBODIMENT EXAMPLES

The features and advantages of the method according to the invention will become more clearly apparent from studying the following application examples.

First Example

In this example it is a question of illustrating, using a purely theoretical example, the principle of the method according to the invention.

FIG. 1 shows a geological object (bold outline) which has been manually delimited in a seismic image, along with the classes (classes C1 to C6) resulting from the application of an applied classification method. The a priori probabilities are discretized as follows $[s_1,s_2,s_3,s_4,s_5]=[0, 0.25, 0.5, 0.75, 1]$. The probability $s_4$ has been attributed to the interior of the outlined zone, and the probability $s_1$ has been attributed to the samples outside this outline. Thus, for this example, only two probability values are shown in the overall distribution of a priori probabilities.

In this example, the risk of having forgotten to interpret a geological object of the sought type in the seismic image is considered to be around 40%. According to the embodiment defined above, this amounts to setting $\alpha=0.6$ (recall that $\alpha=1$ corresponds to the case in which the interpreter is certain to have labelled all of the objects).

The a posteriori probabilities per class are examined below.

Class 1:
  Class 1 corresponds to the pattern C1 from FIG. 1. The probability of the previously produced outline corresponding to points of the sought object has been estimated as 0.75. Outside this surface, the probability is 0. It is therefore now necessary to estimate the proportion of points of class 1 in each of the a priori probability zones, i.e. the proportion $p_{4,1}=p(s_4|C_1)$ of pixels of $C_1$ that are in the a priori probability zone $s_4=0.75$, and the proportion $p(s_1|C_1)$ of pixels of $C_1$ that are in the a priori probability zone $s_1=0$. The other a priori probability values are not represented in $C_1$, hence the proportions $p(s_2|C_1)$, $p(s_3|C_1)$ and $p(s_5|C_1)$ are all zero.

Figure 2A:
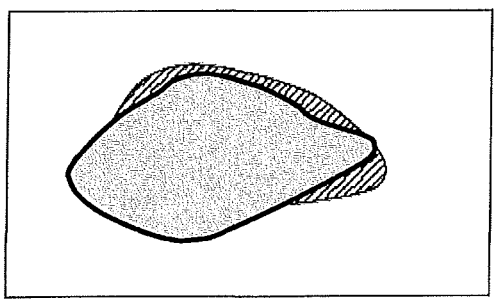
FIGS. 2a and 2b show the samples of the class C1 having an a priori probability of belonging to the geological object to be detected of 0 and 0.75, respectively.
Figure 2B:
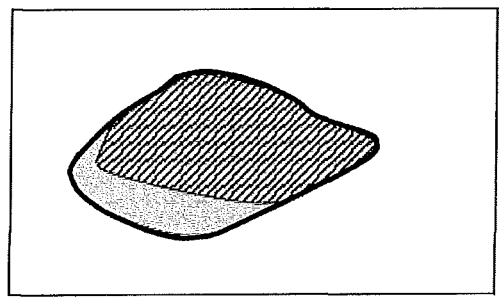
Figure 2C:
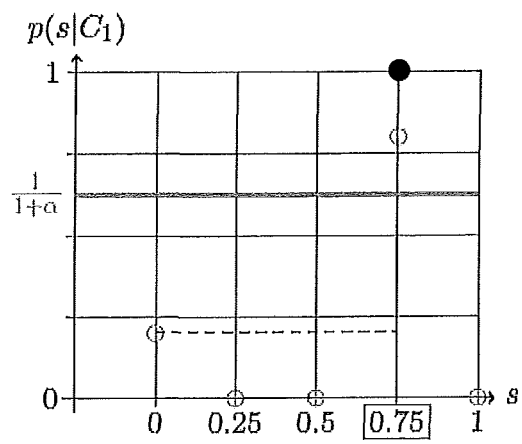
FIG. 2c schematically shows the operation of determining the a posteriori probability associated with the class C1.

For this example, the area of the segmented surface having an a priori probability of 0 is small (see hatched portion in FIG. 2*a*). The area of the segmented surface having an a priori probability of 0.75 is larger (see hatched portion in FIG. 2*b*). The calculation of the a posteriori probability associated with class 1, takes this distribution of values into account and is illustrated schematically in FIG. 2*c*. For each a priori probability value $s_k$, the proportion of points of class 1 having this value $s_k$ is represented by a bar surmounted by a grey ring. The cumulative value of these proportions ($\Sigma^{j\in 1:k} p_{j,1}$) is represented by a dashed line, and the black ring represents the first point of the cumulative distribution curve that is higher than $$\frac{1}{\alpha+1}.$$

Specifically, the value of $$\frac{1}{\alpha+1}$$

determines the threshold for the search for q as defined in section 4 above. Since $$p_1 \leq \frac{1}{\alpha+1}, q$$

is determined, (in this instance q=3) and the a posteriori probability $y_1$ of class $C_1$ is therefore $s_{q+1}=0.75$.

Figure 3A:
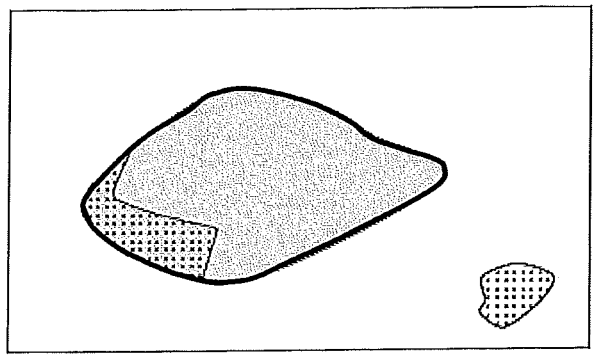
FIG. 3a shows the distribution of the samples belonging to the class C2, with respect to the geological object to be detected.
Figure 3B:
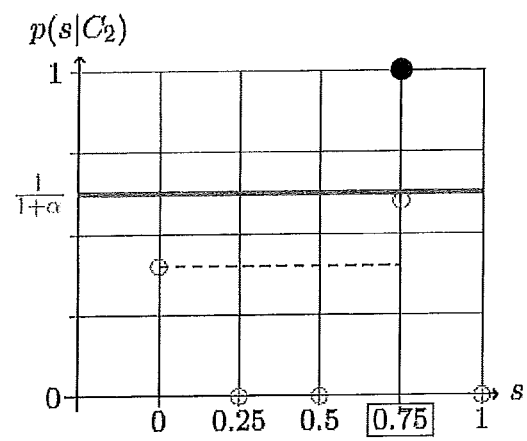
FIG. 3b schematically shows the operation of determining the a posteriori probability associated with the class C2.

Class 2
  The implementation of the method according to the invention for class 2 (pattern C2 in FIG. 1) is identical to that presented for class 1. FIG. 3*a* illustrates the distribution of the samples of the image belonging to class 2 (see pattern C2 in FIG. 1) with respect to the previously interpreted object (delimited by the bold outline). The calculation of $y_2$, the a posteriori probability associated with class 2, takes this distribution of values into account and is illustrated schematically in FIG. 3*b*. The threshold value $$\frac{1}{\alpha+1}$$

is compared with the cumulative distribution curve ($\Sigma^{j\in 1:k} p_{j,1}$) and the a posteriori probability $y_2$ of class $C_2$ is therefore $s_{q+1}=0.75$.

Figure 4A:
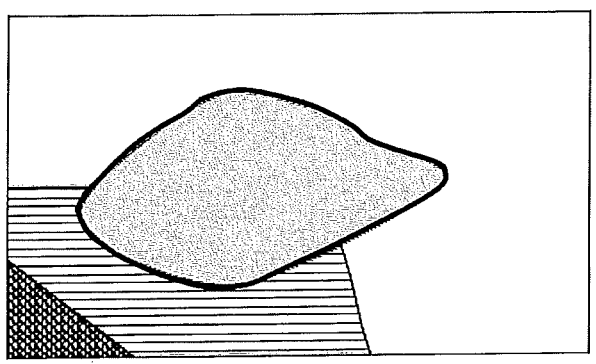
FIG. 4a shows the distribution of the samples belonging to the classes C4, C5 and C6, with respect to the geological object to be detected.
Figure 4B:
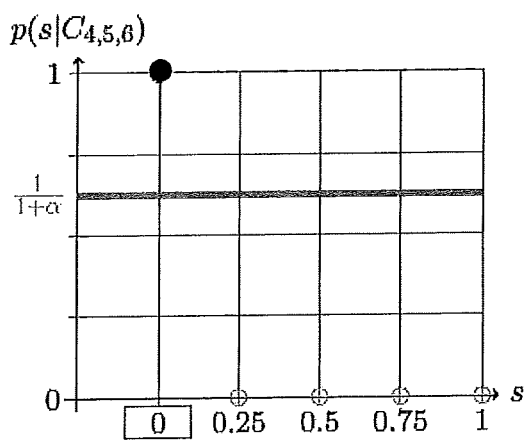
FIG. 4b schematically shows the operation of determining the a posteriori probability associated with the classes C4, C5 and C6.

Classes 4, 5 and 6
  The method according to the invention is applied to classes 4, 5 and 6 (patterns C4, C5 and C6 in FIG. 1). FIG. 4*a* illustrates the distribution of the samples of the image belonging to these classes (see patterns C4, C5 and C6 in FIG. 1). In these three cases, the intersection between the zones for which the a priori probability of the presence of an object of interest and the zones resulting from the classification step is void. Thus, $$p_1 > \frac{1}{\alpha+1},$$

which implies that $y_{4,5,6}=0$. In other words, since the first point of the cumulative distribution curve is above the threshold $$\frac{1}{\alpha+1},$$

all of the points of these zones take, as the a posteriori probability, the abscissa of this first point, namely $s_1=0$, as illustrated in FIG. 4b.

Class 3

Figure 5A:
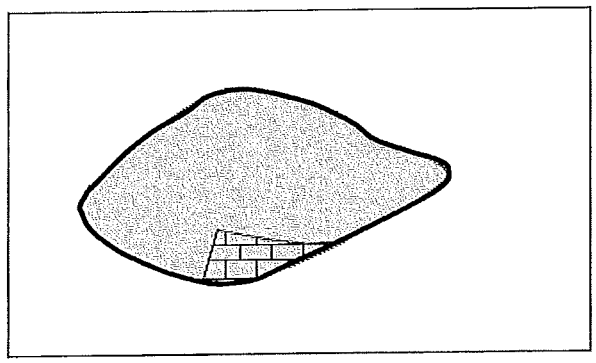
FIG. 5a shows the distribution of the samples belonging to the class C3, with respect to the geological object to be detected.
Figure 5B:
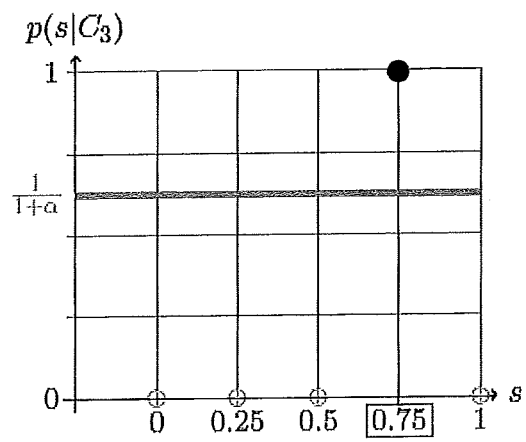
FIG. 5b schematically shows the operation of determining the a posteriori probability associated with the class C3.

Lastly, class 3 (see pattern C3 in FIG. 1) matches only one a priori probability surface, as shown in FIG. 5a, but, unlike classes 4, 5 and 6, all of its points are found at the a priori probability $s_4=0.75$. The cumulative distribution curve (see FIG. 5b) leaves zero only at 0.75. Consequently, $s_q=0.5$ and the a posteriori probability retained for class 3 is $s_{q+1}=0.75$.

Second Example

Figure 6:
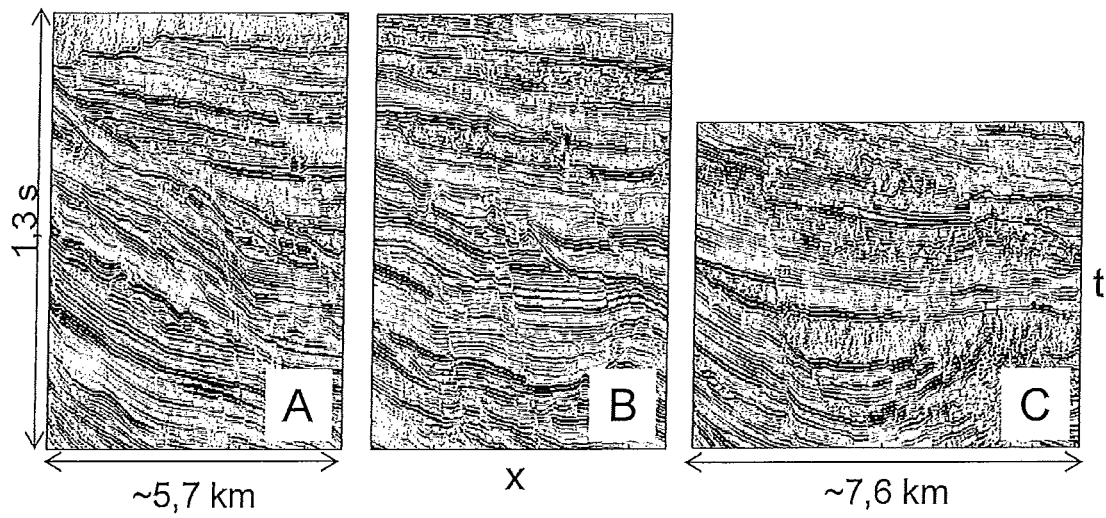
FIGS. 6 and 7 show, respectively, three seismic learning sections selected in an overall seismic volume and the a priori probabilities of belonging to an MTD-type geological object for each of the samples of these sections.
Figure 7:
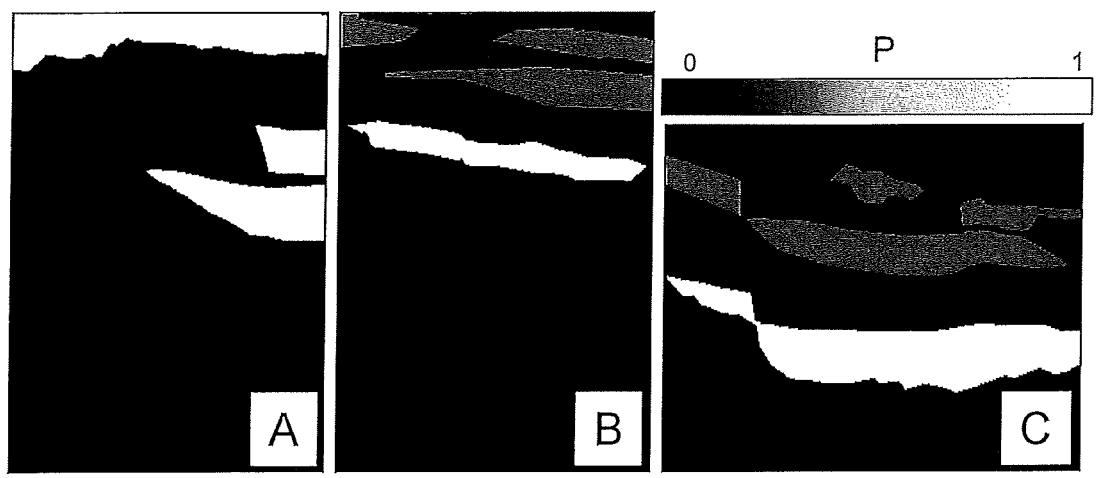

For this example, the geological objects are to be delimited in a 3D seismic image (a 3D seismic cube after stacking, also called a "post-stack" seismic cube) and correspond to MTD (mass-transport deposit)-type sedimentary deposits. These objects can be recognized in the seismic image by an informed interpreter by the various seismic facies that they contain and their arrangement. The seismic image has a vertical sampling interval of 4 ms, and an intertrace distance of 25 m in both (crossline and inline) directions. The MTDs that it is sought to detect have a size of several tens of kilometres laterally, and are at most 100 ms thick. Three 2D sections of the cube are used as learning seismic images (see FIG. 6, which shows these three learning seismic images A, B and C). A pixel of a seismic image therefore has a size of 4 ms×25 m. These three seismic sections have been interpreted by an interpreter, who has delimited zones with a very high a priori probability of belonging P to an MTD-type of geological object (white zones in FIG. 7 for the three learning seismic images A, B and C), a lower probability (dark grey zones in FIG. 7 for the three sections A, B and C) and zones which do not comprise MTD (black zones in FIG. 7 for the three learning seismic images A, B and C).

For this illustrative example, textural attributes of GLCM type, as defined above, are used. In particular, the textural attributes conventionally called "contrast", "correlation", "energy" and "homogeneity" are used (see for example the documents (Haralick, 1976; West et al., 2002)). A study window (the vicinity around the pixel, in which the co-occurrence matrix will be calculated) of 11×11 pixels is chosen. Two different scales are used: distances of d=1 and of d=2 pixels. For each scale, all possible orientations theta are used (four possible orientations for scale 1 and eight for scale 2). For the calculation, it is necessary to limit the number of possible levels for the seismic amplitude values (grey levels). This number is often 256, 64, 8 or lower; in the present case only two grey levels are chosen. The calculations are thus shorter, since the time for calculating the GLCM attributes increases with the square of the number of grey levels. To compensate for the loss of amplitude information, an attribute from the envelope of the seismic signal is added to the set of GLCM attributes: for a pixel, it is the result of Gaussian-filtering the image of the seismic envelope, with a 2D Gaussian kernel, close to the window of 11×11 pixels in size. The GLCM attributes, as well as this attribute based on the envelope, are calculated for all of the pixels of the learning image. The attributes are then normalized.

For this implementation of the invention, the dimension of the attribute space is decreased. For this, principal component analysis (PCA) is used, which is applied separately to the attributes from the scales d=1 and d=2. The attribute from the envelope is left outside the PCA. For each of the two samples, only those eigenvectors for which the cumulative sum of the normalized eigenvalues is higher than 0.97 are retained. There are then three new attributes for the scale d=1 and six for the scale d=2. Weightings of 0.5 are imposed on the attributes of scale 2 (to ensure an equal representation of scales 1 and 2), and the attribute from the envelope, with a weighting of 3, is added to this set of nine new attributes.

Thus, the base of the new attribute space consists of these 10 eigenvectors: the first three eigenvectors from the PCA at scale 1, the following six (with a weighting of 0.5) from the PCA at scale 2, and the last from the envelope, with a weighting of 3.

Figure 8:
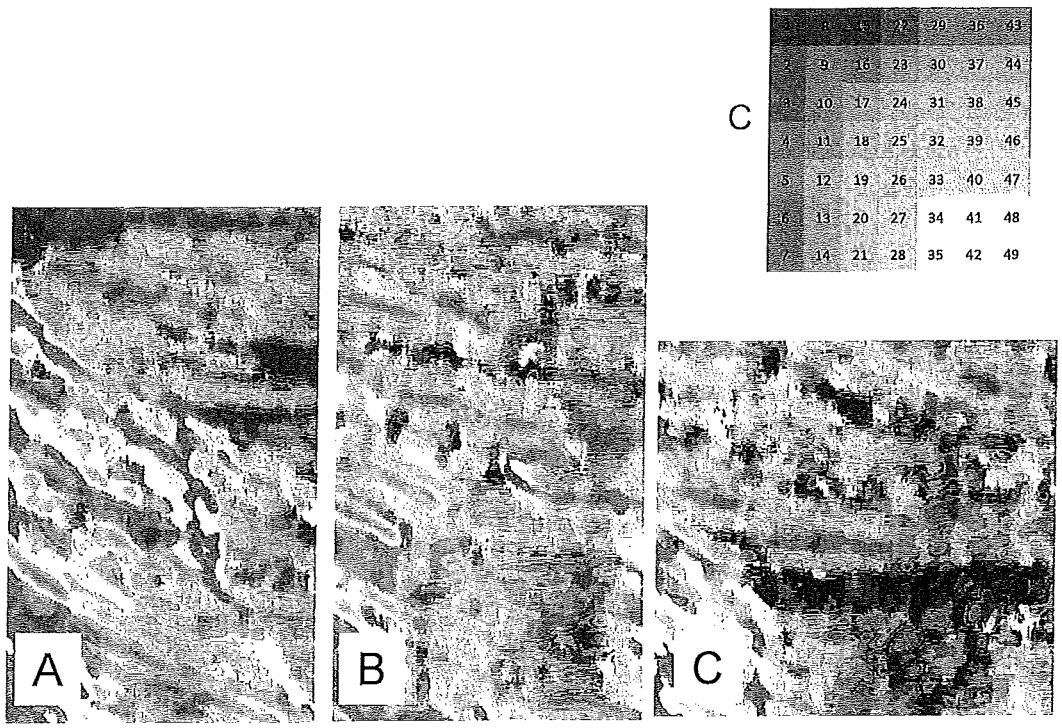
FIG. 8 shows the distribution of the samples of the three learning images from FIG. 6 over 49 classes.

Next, a GTM (generative topographic mapping)-type unsupervised classification algorithm, such as defined above, is applied in its 2D version (the manifold generated will be of dimension 2). Thus, for each pixel of each learning image, a class label from among 49 classes (see FIG. 8, which shows the distribution of the 49 classes in each of the learning seismic images A, B and C) is determined.

Figure 9:
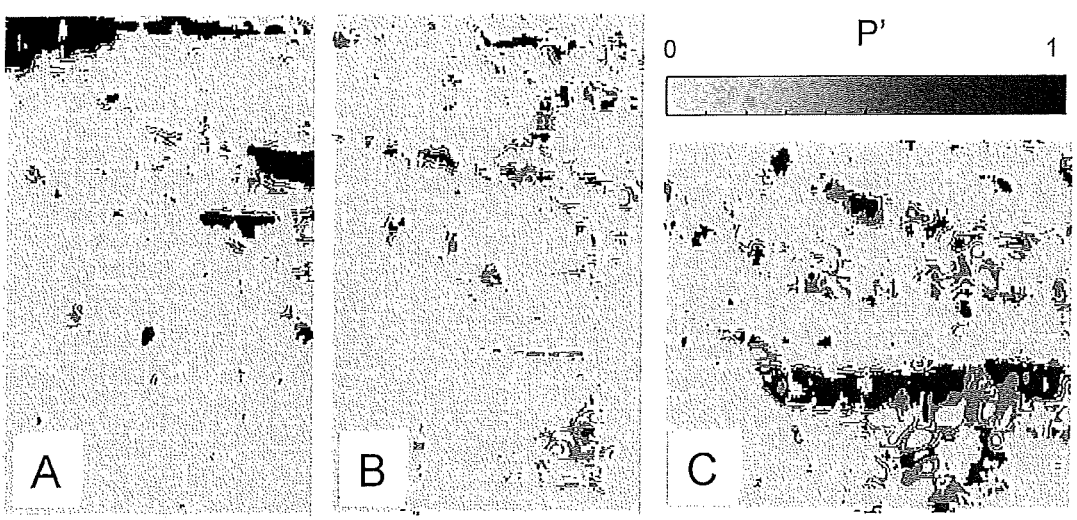
FIG. 9 shows the a posteriori probabilities of belonging to an MTD-type geological object for each of the three learning images from FIG. 6, these a posteriori probabilities having been determined according to the method of the invention.

Next, the preferred implementation of the method according to the invention is applied, as described in step 4, to assign an a posteriori probability of the presence of the objects to each class. The parameter α is set at 0.8 (degree of confidence in the interpretation). The associated a posteriori probability is then determined for each class. FIG. 9 shows the a posteriori probabilities P' thus obtained for each of the learning seismic images A, B and C.

Figure 10:
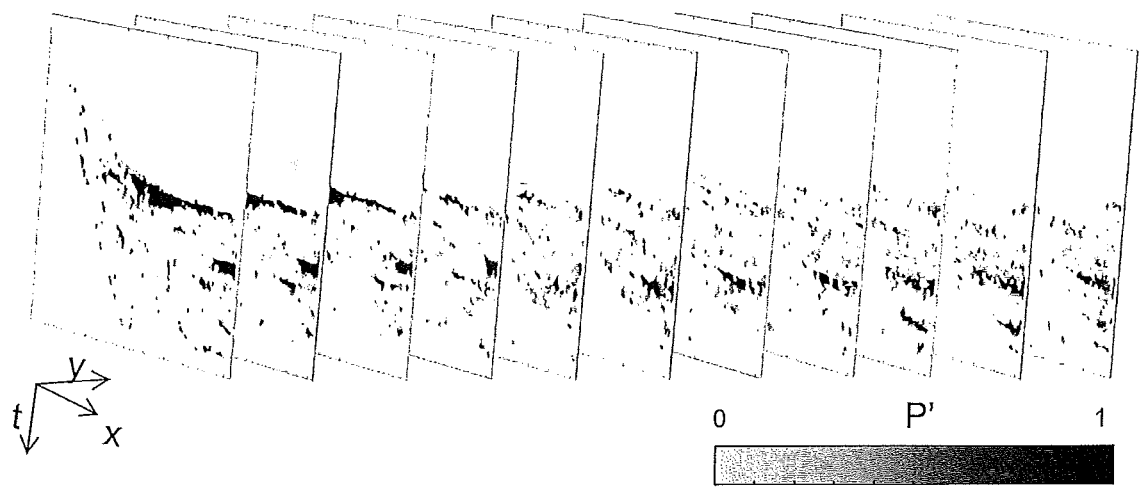
FIG. 10 shows the result of propagating the a posteriori probabilities of belonging to an MTD-type geological object, determined for each of the three learning images from FIG. 6, to 72 sections in the overall seismic volume to be interpreted.

Next, the a posteriori probabilities thus determined for each of the learning seismic images are "propagated" to a series of 72 parallel 2D sections extracted from the 3D seismic cube, which are, advantageously, parallel to the learning images. The sections are extracted with a sampling interval of one section every 250 m (one section out of 10), which is relatively fine with respect to the size of the sought objects. FIG. 10 shows a portion of these sections depicted as a posteriori probabilities P'.

For illustrative purposes and to determine a complete seismic volume, each section has been replicated 10 times, to represent the overall 3D seismic volume. An interpolation of the values of the a posteriori probabilities between each section could advantageously have been carried out. Next, a post-processing treatment is applied by thresholding the values of the probabilities. More specifically, for this example, only those pixels for which the a posteriori probability values are equal to 1 are retained, followed by thresholding on the basis of the size of the objects and the distribution of the class numbers inside the objects.

Figure 11:
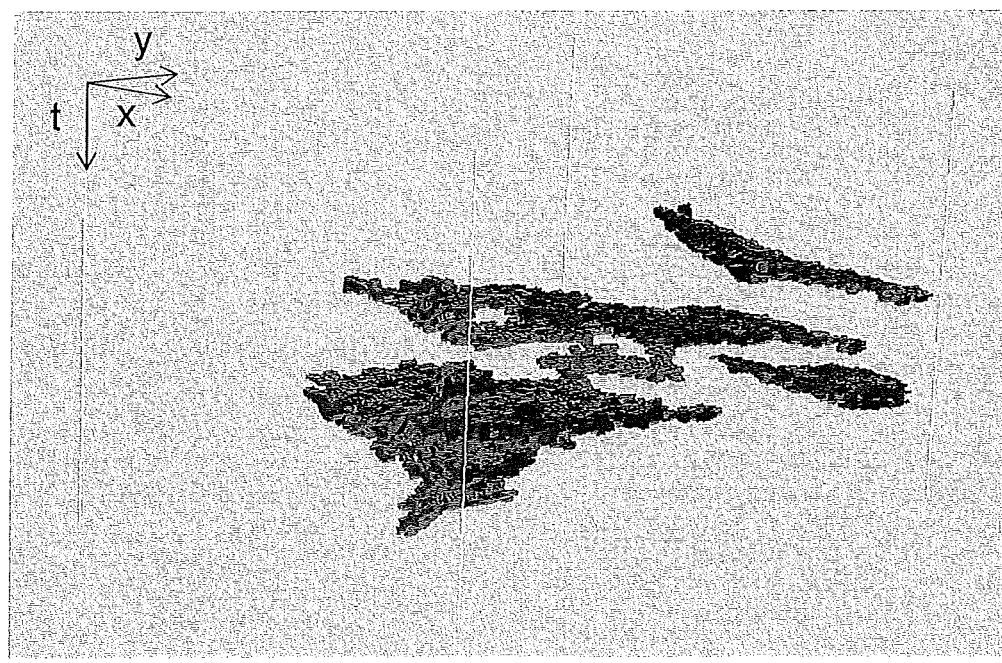
FIG. 11 shows the samples of the overall seismic volume to be interpreted having been detected as belonging to a PTD-type geological object by means of the method according to the invention.

The delimitation of the sought-after MTDs is achieved, as presented in FIG. 11. It may be seen that the method according to the invention has thus made it possible (i) to automatically delimit these objects without omitting portions due to the difference in facies, and (ii) to retain the information relating to these various facies within the delimited object itself, which is subsequently useful when it comes to interpreting the properties of the object.

The invention claimed is:

1. A computer-implemented method for automatically detecting at least one geological object belonging to a type of geological object in at least one seismic image of a subterranean formation, on a basis of a priori probabilities of belonging to the type of geological object that are assigned to samples of the at least one image, comprising:

A. defining an operation for transforming the at least one seismic image into seismic attributes and applying the operation for transforming to determine seismic attributes of the at least one seismic image;

B. applying an unsupervised classification operation to the seismic attributes of the at least one seismic image and determining a class of each sample of the at least one seismic image;

C. determining for each class an a posteriori probability of each sample of a class belonging to the type of geological object according to the priori probabilities of each sample of the image of the class belonging to the class according to a parameter describing confidence in the a priori probabilities; and D. for each sample of the image, based on the class of the sample, assigning the determined a posteriori probability of belonging to the type of geological object for samples of the class; and wherein the at least one geological object belonging to the type of geological object which is detected based on the determined a posteriori probabilities of belonging to the type of geological object for each sample of the image and a geological model representative of the formation based on at least the detected geological objects, defining a plan for exploiting the hydrocarbons of the formation based on at least the geological model, and exploiting hydrocarbons of the formation according to the defined plan.

2. The method according to claim 1, wherein the a posteriori probability $y_i$ of the samples of the class i belonging to the type of geological object is determined by:

i. if $p_{1,i} > \frac{1}{\alpha+1}$, $y_i = s_1$.

ii. if $p_{1,i} \leq \frac{1}{\alpha+1}$, $q_i = \max\left\{k \in 1:n \text{ such that } \sum_{j \in 1:k} p_{j,i} \leq \frac{1}{\alpha+1}\right\}$ is determined, and a. if $\sum_{j \in 1:q} p_{j,i} = \frac{1}{\alpha+1}$, then $y_i = s_q$.

b. if $\sum_{j \in 1:q} p_{j,i} < \frac{1}{\alpha+1}$, then if $q = n$, $y_i = s_n$ if $q < n$, $y_i = s_{q+1}$.

where
X is the vector containing a value of a priori probability of belonging for each sample of the seismic image;
L is the vector containing, for each sample of the seismic image, an identifier of the class to which the sample belongs;
$S = \{s_1, s_2, \ldots, s_n\} = \{s_k, k \in 1:n\}$ with $0 = s_1 < s_2 < \ldots < s_n = 1$, is the set of values taken by elements of the vector X;
$C_i$, $i \in L$ is the identifier class i; and $p_{k,i} = p(s_k | C_i)$ is the proportion of points of $C_i$ having an a priori probability value of $s_k$.

3. The method according to claim 1, wherein the seismic attributes are textural attributes.

4. The method according to claim 1, wherein a decrease in dimensions is applied to the determined attributes by the transforming operation.

5. The method according to claim 4, wherein the decrease in dimensions is carried out by a principal component analysis.

6. The method according to claim 4, wherein the decrease in dimensions is carried out by an analysis using an attribute selection method.

7. The method according to step B) of claim 1, comprising applying an unsupervised classification method which is a generative topographic mapping method.

8. The method according to claim 1, wherein at least steps A) to D) are applied to a first seismic image, and wherein at least the steps A) to D) are applied to a second seismic image comprising:
1. transforming the second seismic image into seismic attributes;
2. applying the unsupervised classification operation to the attributes of the second seismic image and determining a class for each sample of the second seismic image; and
3. for each class of the second seismic image and for each sample of the second seismic image belonging to the class, assigning a determined probability of belonging to the type of geological object in the class in the first seismic image.

9. The method according to claim 1, wherein the geological objects belonging to the type of geological object are detected in the at least one seismic image by using a thresholding method applied to a value of the determined a posteriori probabilities of belonging to the type of geological object for each sample of the at least one seismic image.

10. A method for exploiting a subterranean formation comprising hydrocarbons by use of at least one seismic image relating to the formation, comprising:
detecting geological objects belonging to at least one type of geological object in the at least one seismic image by use of the method according to claim 1;
defining a geological model that is representative of the formation based on at least the detected at least one geological object and defining a plan for exploiting the hydrocarbons of the formation that is based on at least of the geological model; and
exploiting the hydrocarbons of the formation according to the plan for exploiting.

11. A computer program product stored on a tangible recording medium is executed by a processor to perform the method of claim 1.

* * * * *